United States Patent
Pani

(10) Patent No.: US 8,699,373 B1
(45) Date of Patent: Apr. 15, 2014

(54) SERVICE-CARD LOAD DISTRIBUTION

(75) Inventor: Ayaskant Pani, Fremont, CA (US)

(73) Assignee: Google Inc., Mountain View, CA (US)

( * ) Notice: Subject to any disclaimer, the term of this patent is extended or adjusted under 35 U.S.C. 154(b) by 133 days.

(21) Appl. No.: 13/410,692

(22) Filed: Mar. 2, 2012

(51) Int. Cl.
*H04L 12/26* (2006.01)
*H04L 12/56* (2006.01)

(52) U.S. Cl.
CPC .......... *H04L 45/245* (2013.01); *H04L 45/7453* (2013.01)
USPC ............................ 370/252; 370/230; 370/401

(58) Field of Classification Search
CPC .................................................... H04L 45/245
USPC ......................................... 370/401, 230, 252
See application file for complete search history.

(56) References Cited

U.S. PATENT DOCUMENTS

| | | | | |
|---|---|---|---|---|
| 2007/0104189 A1* | 5/2007 | Hsu et al. | ...................... | 370/389 |
| 2008/0240133 A1* | 10/2008 | Tanaka | .......................... | 370/401 |
| 2012/0002673 A1* | 1/2012 | Mohapatra et al. | ........... | 370/392 |
| 2013/0083797 A9* | 4/2013 | Narasimhan | .................. | 370/392 |

* cited by examiner

*Primary Examiner* — Dang Ton
*Assistant Examiner* — Mewale Ambaye
(74) *Attorney, Agent, or Firm* — Foley & Lardner LLP; Edward A. Gordon

(57) ABSTRACT

Systems and methods are disclosed herein for anchoring a data session to a line card. The system includes a networking device that includes multiple line cards, which receive incoming packets from a link aggregation device. The line cards are communicatively coupled by a backplane to a routing control processor, which receives from the link aggregation device process information indicative of a process by which the link aggregation device determines to which line card data packets associated with a data session are forwarded. The routing control processor also receives a control packet requesting initiation of a new data session. Then, the routing control processor determines to which line card the link aggregation device will be forwarding data packets associated with the new data session based on the received process information and anchors the new data session based on the determined line card.

12 Claims, 3 Drawing Sheets

SERVICE-CARD LOAD DISTRIBUTION

FIELD OF THE INVENTION

In general, the invention relates to systems and methods for distributing loads on service cards.

BACKGROUND OF THE INVENTION

Conventional service providing systems that include line cards with specialized services (service cards) perform load distribution such that all specialized service cards receive similar amounts of data to process. This load distribution is usually entirely based on local logic present in the service providing system. During a phase of the control session, a hash function, whose purpose is to distribute the load somewhat equally across all service cards, is typically performed on various data connection parameters to determine to which card a client's data traffic will be anchored. Anchoring a data stream to a service card essentially assigns the data stream to be processed by that service card. However, data streams often ingress on line cards that are different from their anchor service cards. In this case, the ingress line card forwards the data to the anchoring line card along a backplane, which has a finite bandwidth. Problems arise when there is a large amount of data being forwarded between line cards and service cards, leading to congestion on the backplane.

Previous attempts to reduce the use of backplane bandwidth have ensured that data traffic is anchored on the line card that receives control traffic (or the control ingress line card) if the control ingress line card has the specialized service capability. Alternatively, data traffic is directed to the line card that incurs minimal backplane bandwidth from the control ingress line card (e.g., the nearest line card with the specialized service capability). However, the distribution (or anchoring) of traffic to a line card occurs during the control session, and often, control traffic and data traffic are distributed differently. This means that control traffic might ingress on a line card that is different from the line card that receives the data traffic. This occurs because the hashing logic used to distribute traffic over the ether-channel uses parameters such as layer-4 service port information, which are distinct for control and data traffic. For example, in DTLS/CAPWAP wireless service, the layer-4 port used for control traffic is distinct from the layer-4 port used for data traffic. Thus, during the control phase, conventional service providing systems still have no information regarding which line card will receive the incoming data traffic. Anchoring the data traffic on the service card that is closest to the line card that receives the control traffic does not necessarily reduce use of the backplane bandwidth. In addition, once a data session is anchored, it is difficult and often impossible to change the anchor without disrupting the data traffic flow.

SUMMARY

Accordingly, systems and methods disclosed herein provide load distribution on service cards that reduces use of backplane bandwidth. According to one aspect, the invention relates to a system for anchoring a data session to a line card. The system includes a networking device such as a router or a switch that includes multiple line cards, which receive incoming packets from a peer link aggregation device. The networking device also includes a routing control processor, which receives from the link aggregation device process information indicative of a process by which the link aggregation device determines to which line card data packets associated with a data session are forwarded. The line cards and the routing control processor are communicatively coupled by a backplane. The routing control processor also receives a control packet requesting initiation of a new data session. Then, the routing control processor determines to which line card the link aggregation device will be forwarding data packets associated with the new data session based on the received process information and anchors the new data session based on the determined line card.

According to another aspect, the invention relates to a method for providing load distribution on service cards that reduces use of backplane bandwidth. The method comprises receiving by multiple line cards in a networking device incoming packets from a link aggregation device. A routing control processor in the networking device receives from the link aggregation device process information indicative of a process by which the link aggregation device determines to which line card data packets associated with a data session are forwarded. A backbone communicatively couples the line cards and the routing control processor in the networking device. The method further comprises receiving by the routing control processor a set of control packets requesting initiation of a new data session. Then, the routing control processor determines to which line card the link aggregation device will be forwarding data packets associated with the new data session based on the received process information and anchors the new data session based on the determined line card.

BRIEF DESCRIPTION

The above and other features of the present disclosure, including its nature and its various advantages, will be more apparent upon consideration of the following detailed description, taken in conjunction with the accompanying drawings in which.

DETAILED DESCRIPTION

Figure 1:
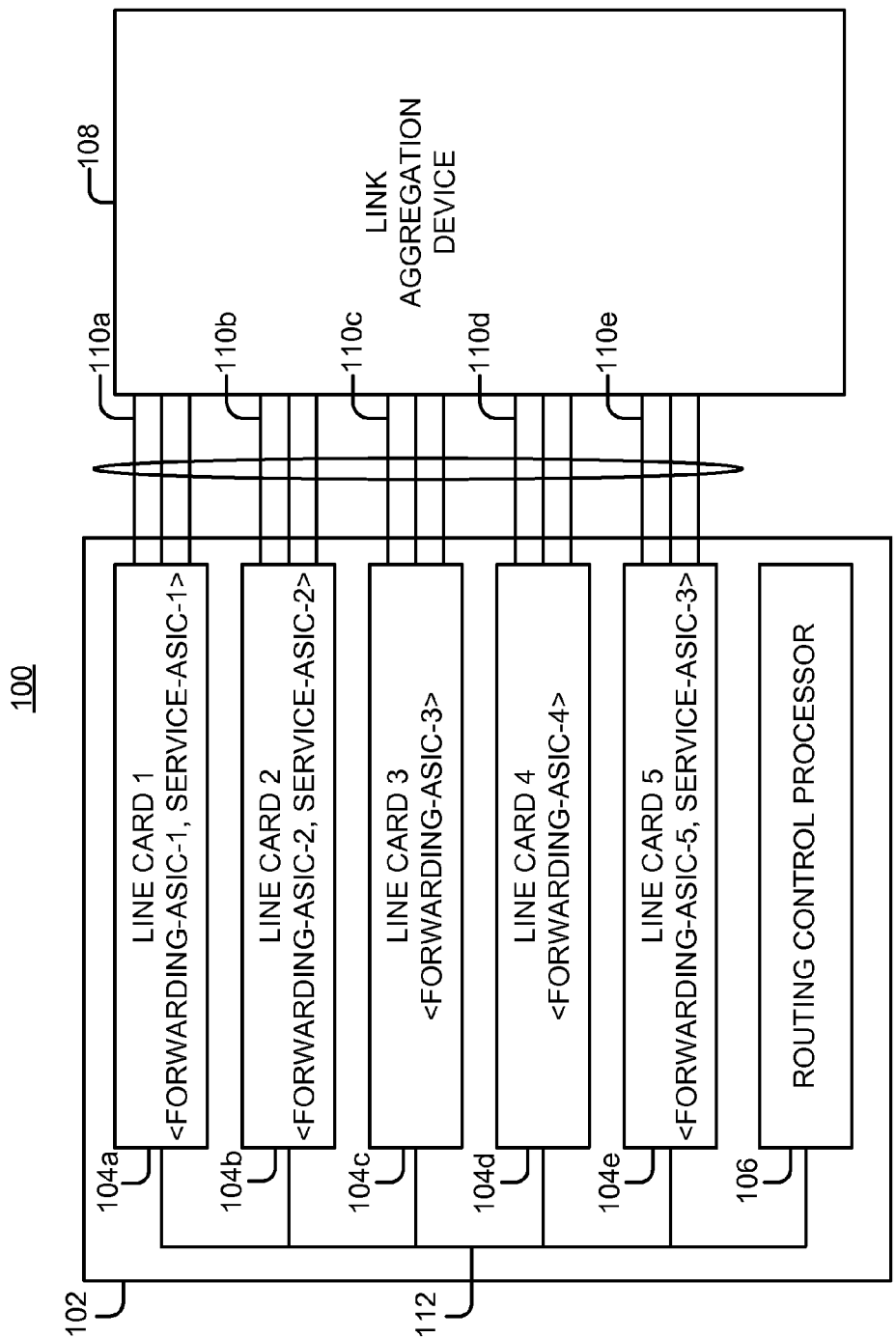
FIG. 1 is a diagram of a system that anchors data session based on a determined line card, according to an illustrative embodiment of the invention.

To provide an overall understanding of the invention, certain illustrative embodiments will now be described, including a system for distributing loads on service cards. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. FIG. 1 is a diagram of a system 100 that anchors data session based on a determined line card, according to an illustrative embodiment of the invention. System 100 includes a service providing system 102, which is a router that includes five line cards 104a-104e (generally line cards 104) and a routing control processor 106, and a link aggregation device 108. Within the service providing system 102, the line cards 104 and routing control processor 106 are communicatively coupled to one another over a backplane 112. The link aggregation device 108 sends control and data traffic to the service providing system 102 over links 110*a*-110*e* (generally links 110). The routing control processor 106 anchors a data session to a particular line card that reduces bandwidth usage on the backplane 112.

Line cards 104 are input/output cards that are typically installed in multiple slots on a chassis. Line cards 104 provide several communications ports and contain ASIC chips that process the type of traffic that is supported by the line card. Examples of line card types include Ethernet, token ring, RDDI, ATM, and T1. The same chassis can hold multiple line cards of different types. Furthermore, line cards 104 may all be on the same chassis or on multiple chassis. Some line cards 104 have specialized service daughter cards. For example, line card 104*a*, 104*b*, and 104*e* have specialized service capabilities (Service-ASIC-1, Service-ASIC-2, and Service-ASIC-3, respectively). Examples of specialized service capabilities include SSL load balancing, wireless client traffic termination, or any other special services that may be required in order to process data.

To establish a data session, control packets are typically sent by a client requesting the specialized data service or a proxy device such as an access point or an access switch. The service providing system 102 and the client exchange control packets, which establish the kind of service requested (e.g., level of encryption or bandwidth or quality of service) and provide a way for mutual authentication and/or authorization. During the control plane exchange, both parties exchange relevant information regarding the data session traffic that will follow after successful establishment of the data session.

Link aggregation device 108 receives control and data traffic from the client and forwards the traffic to the service providing system 102 for processing. To determine along which link 110 to send a traffic stream, link aggregation device 108 uses a method such as a hash algorithm. A hash algorithm receives as input various data connection parameters such as source/destination IP addresses, layer 3 protocol, layer 4 port numbers (source port and destination port), IP security association index, or any other parameters that may be used by a hash algorithm. The algorithm then outputs a value corresponding to a link 110 along which to send the data traffic. By using a hash algorithm, the link aggregation device 108 distributes the load to the various line cards 104 in the service providing system 102 in a pseudo-random fashion, such that the five line cards 104 receive similar amounts of traffic as one another.

Upon connection between the link aggregation device 108 and the service providing system 102, a control protocol such as the Link Aggregation Control Protocol (LACP) is performed to bundle multiple physical ports together. In LACP, the link aggregation device 108 and the service providing system 102 communicate with each other to combine multiple links in parallel, thus providing higher throughput and increased bandwidth compared to systems that do not use link aggregation. In system 100, during a control protocol such as LACP, link aggregation device 108 also transmits to the service providing system 102 information indicative of the method in which it determines along which link 110 to send particular traffic. When the method includes a hash algorithm, the various data connection input parameters to the hash algorithm are also transmitted to the service providing system 102. Thus, when the service providing system 102 receives control packets from the link aggregation device 108, the service providing system 102 has knowledge of the hash algorithm as well as its inputs and computes the algorithm to determine which line card 104 is most likely to directly receive the incoming data traffic of a particular data session from the link aggregation device 108. The routing control processor 106 then anchors the data session to the determined line card.

Service providing system 102 offers an important advantage over conventional service providing systems, which distribute the loads across the line cards based entirely on local logic and do not have information regarding how a peer system (such as a link aggregation device) distributes the loads across the links. Anchoring a load without knowledge of the link over which data will be transmitted incurs a large amount of wasted bandwidth on the backplane 112 because data associated with a session anchored to a line card frequently arrives on a different line card and must be forwarded across the backplane for processing. By anchoring the data stream to the line card 104 that is most likely to receive the ingress data traffic, service providing system 102 reduces use of the backplane bandwidth compared to conventional systems.

As an example, data that ingresses on a particular line card (e.g., line card 104*a*) sometimes requires a special service. The routing control processor determines that line card 104*a* is the most likely line card to receive the ingress traffic, so if Service-ASIC-1 satisfies this service, the routing control processor anchors the data session to Service-ASIC-1. In this case, no use of the backplane is required because line card 104*a* will not forward the data to another line card. If Service-ASIC-1 does not satisfy the required service, the routing control processor anchors the data session to the line card that satisfies the services and incurs minimum usage of the backplane bandwidth (e.g., line card 104*b* or 104*e*). For example, compared to line card 104*e*, line card 104*b* is closer to line card 104*a*. For some backplane architectures, e.g., token ring-based backplanes, it is likely that forwarding data from line card 104*a* to line card 104*b* incurs less backplane bandwidth than forwarding data from line card 104*a* to line card 104*e*. In this sense, line card 104*b* is preferable to line card 104*e*, and if Service-ASIC-2 satisfies the required service, the routing control processor 106 would anchor the data session to line card 104*b*.

In some embodiments, the routing control processor 106 receives information regarding how the link aggregation device 108 determines along which link 110 to send data traffic directly from the link aggregation device 108. In other embodiments, this information is sent to the routing control processor 106 by an intermediate device.

Figure 2:
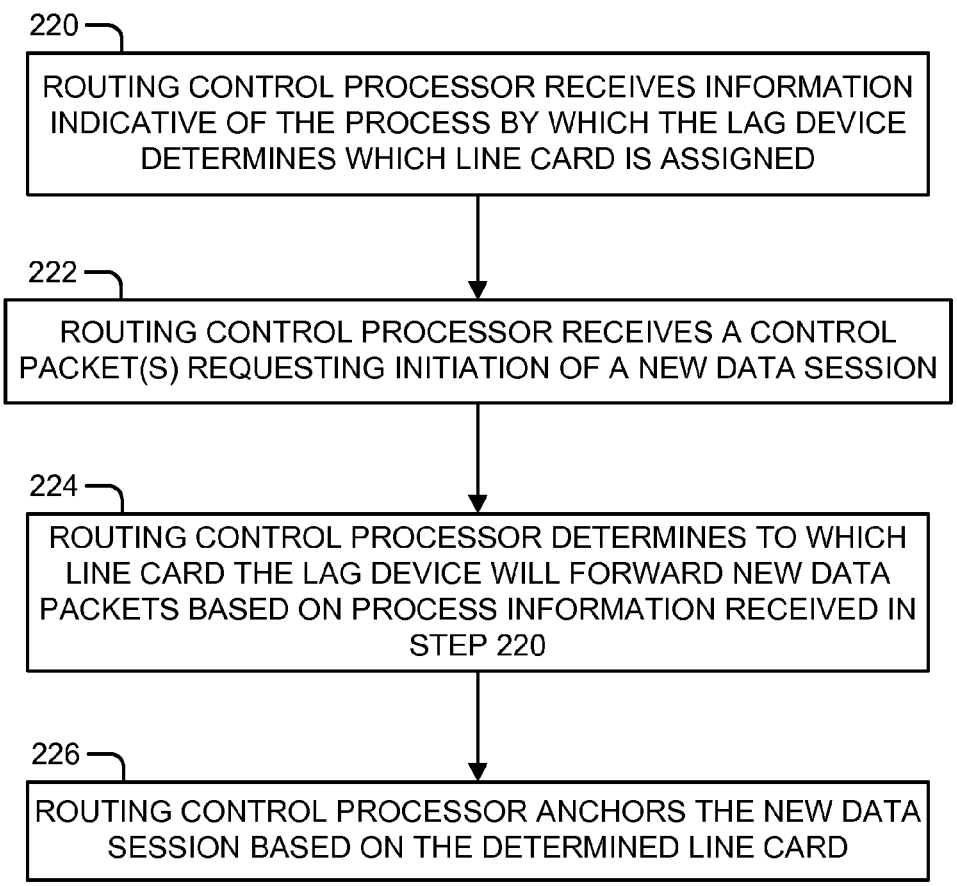
FIG. 2 is a flowchart of a method used by a routing control processor to anchor data session based on a determined line card, according to an illustrative embodiment of the invention.

FIG. 2 is a flowchart of a method 200 used by routing control processor 106 of FIG. 1 to anchor a data session based on a determined line card, according to an illustrative embodiment of the invention. Method 200 includes the steps of receiving information indicative of the process by which the link aggregation device 108 determines which line card 104 is assigned (step 220), receiving one or more control packets requesting initiation of a new data session (step 222), determining to which line card the link aggregation device 108 will forward the data packets of the new session (step 224), and anchoring the new data session based on the determined line card (step 226).

First, the routing control processor 106 receives from the link aggregation device 108 information indicative of the process by which the link aggregation device 108 determines which line card is assigned (step 220). Typically this information is in the form of a hashing algorithm, and the logic in forming the hash is sent by the link aggregation device 108 to the routing control processor 106. Such information may include the algorithm and its input parameters, or any other information that the link aggregation device 108 uses to determine along which link 110 to send a data stream. The hashing algorithm can be any type of hash function that returns a hash value. For example, the hashing algorithm can be a polynomial hash with varying modulo value.

Then the routing control processor 106 receives from the link aggregation device 108 a control packet requesting initiation of a new data session (step 222). Typically, the data clients or some other device (such as an access point or an access switch acting on behalf of the clients) send control packets to establish a data session requiring specialized service. For example, a wireless client might request wireless access from the system. Alternatively, a wireless client might request termination of wireless data traffic. The link aggregation device 108 forwards control packets to the service providing system 102 in order to establish a connection before sending data packets. The control packets establish the kind of service requested (e.g. level of encryption or bandwidth or quality of service) and provide a way for mutual authentication and/or authorization. During the exchange of control packets, the client and the service providing system 102 exchange relevant information regarding the data session traffic that follows after successful establishment of the data session.

The routing control processor 106 then uses the information received in step 220 in order to determine to which line card 104 the link aggregation device 108 will send the new data packets (step 224). As an example, the control packet received in step 222 may include values for input parameters to the hashing algorithm, for example, in the packet header. Thus, the routing control processor 106 can perform the hashing algorithm to determine which line card 104 will be most likely to receive the new data packets from the link aggregation device 108. Finally, the routing control processor 106 anchors the new data session based on the determined line card (step 226). The data packets are expected to ingress on the determined line card, thereby reducing the need for forwarding data between line cards and reducing use of the backplane bandwidth.

Figure 3:
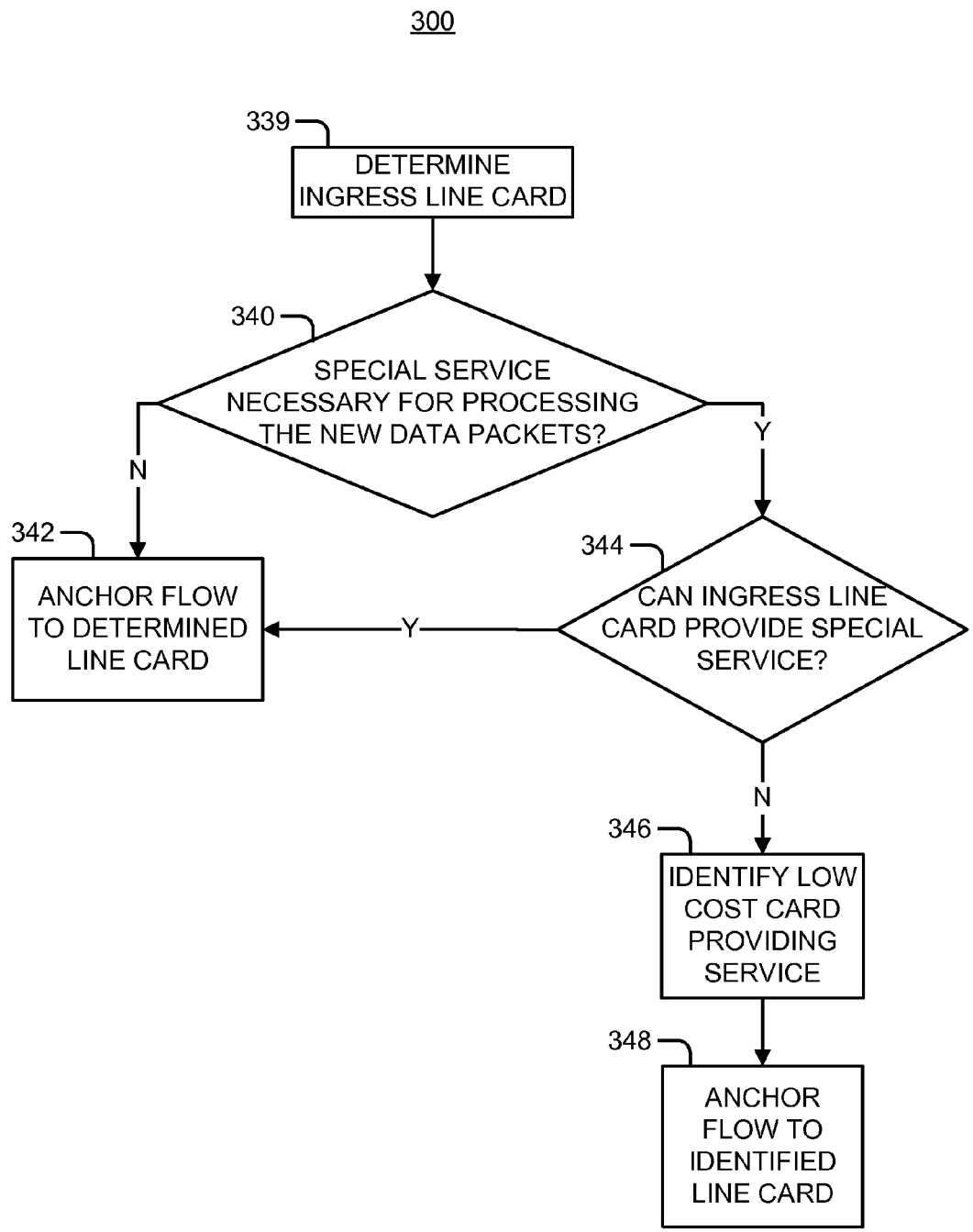
FIG. 3 is a flowchart of a method used by a routing control processor to select a line card based on whether a service is necessary for processing data, according to an illustrative embodiment of the invention.

FIG. 3 is a flowchart of a method 300 used by a routing control processor 106 to select a line card based on whether a service is necessary for processing data, according to an illustrative embodiment of the invention. Method 300 includes the step of determining which line card will receive ingress data traffic (step 339) and a decision block that determines whether a service is necessary for processing the new data packets (decision 340).

If the routing control processor 106 determines there is no service necessary, the line card determined to be most likely to receive the data packets in step 339 is selected as the anchor (step 342). For example, some data streams do not require special service ASICs for processing. In this case, the routing control processor 106 does not need to consider the special service capability of a line card 104 when selecting one for anchoring.

Alternatively, the routing control processor could determine that a specialized service is necessary for processing a new data stream (decision 340). In this case, the routing control processor 106 determines whether the ingress line card determined in step 339 is capable of providing the specialized service (decision 344). If the ingress line card can provide the specialized service, the routing control processor 106 anchors the data session to the determined ingress line card (step 342). However, if it is determined that that the ingress line card is unable to provide the specialized service (because either it does not have the specialized ASICs to provide service or the specialized ASIC(s) have reached their limit of how many data sessions they can support), the routing control processor 106 identifies a line card that can provide the specialized service and has the lowest cost (step 346) and anchors the data session to the identified line card (step 348).

In some embodiments, the low cost criterion in step 346 is based on bandwidth on the backplane or any other parameter indicative of a cost of forwarding data between line cards in a system. For example, additional parameters or a combination of parameters could also be taken into account, including the load currently assigned to each service card. In such embodiments, if a service card that would incur low backplane bandwidth usage is already heavily loaded, the routing control processor 106 may select a service card that would incur more backplane bandwidth usage but has a lower processing load. For example, the routing control processor 106 may compute the load on a service card, and if the computed load exceeds a threshold, the routing control processor 106 selects another service card. Furthermore, the ingress line card determined in step 339 may be heavily loaded. In this case, the routing control processor 106 may select another line card even if it is determined in decision block 340 that no special service is necessary for processing the data packets.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A networking device comprising:
a plurality of line cards for receiving incoming packets from a link aggregation device; a backplane communicatively coupling the plurality of line cards; and a routing control processor coupled to the backplane configured to:
receive from the link aggregation device process information, including at least one of information identifying a hash algorithm and information identifying a set of input parameters to a hash algorithm, used by the link aggregation device to determine to which of the plurality of line cards data packets associated with a data session are forwarded;
receive a control packet requesting initiation of a new data session, wherein the control packet includes a value for at least one input parameter used by the link aggregation device in the hash algorithm;
determine to which of the plurality of line cards the link aggregation device will be forwarding data packets associated with the new data session based on the received process information and the input parameter value included in the control packet; and
anchor the new data session based on the determined line card.

2. The networking device of claim 1, wherein the routing control processor is further configured to:
identify a service necessary for processing of data packets associated with the new data session, wherein anchoring the new data session based on the determined line card comprises anchoring the new data session to a line card configured to provide the identified service.

3. The networking device of claim 2, wherein:
the routing control processor is further configured to determine to which of the plurality of line cards to anchor the new data session by identifying the line card providing the identified service to which data packets can be forwarded at a lowest cost from determined line card; and
the backplane is configured to be a token ring or a form of shared-bus access mechanism that communicatively couples the plurality of line cards.

4. The networking device of claim 3, wherein
the service necessary is provided by an ASIC coupled to the identified line card.

5. The networking device of claim 1, wherein the process information indicates a set of input parameters to a hash algorithm used by the link aggregation device in determining to which of the plurality of line cards the link aggregation device will forward data packets.

6. The networking device of claim 1, wherein the process information includes a hashing algorithm.

7. A method for anchoring a data session to a line card, comprising:
receiving, by a plurality of line cards in a networking device from a link aggregation device, incoming packets, wherein the plurality of line cards are communicatively coupled by a backplane;
receiving, by a routing control processor from the link aggregation device, process information, including at least one of information identifying a hash algorithm and information identifying a set of input parameters to a hash algorithm, used by the link aggregation device to determine to which of the plurality of line cards data packets associated with a data session are forwarded, wherein the routing control processor is coupled to the backplane;
receiving, by the routing control processor from the link aggregation device, a control packet requesting initiation of a new data session, wherein the control packet includes a value for at least one input parameter used by the link aggregation device in the hash algorithm;
determining, by the routing control processor, to which of the plurality of line cards the link aggregation device will be forwarding data packets associated with the new data session based on the received process information and the input parameter value included in the control packet; and
anchoring, by the routing control processor, the new data session based on the determined line card.

8. The method of claim 7, further comprising:
identifying, by the routing control processor, a service necessary for processing of data packets associated with the new data session, wherein anchoring the new data session to the determined line card comprises anchoring the new data session to a line card configured to provide the identified service.

9. The method of claim 8, wherein the backplane is configured to be a token ring or a form of shared-bus access mechanism that communicatively couples the plurality of line cards, further comprising:
determining, by the routing control processor, to which of the plurality of line cards to anchor the new data session by identifying the line card providing the identified service to which data packets can be forwarded at a lowest cost from determined line card.

10. The method of claim 9, wherein:
service necessary for processing of data packets associated with the new data session, is provided by an ASIC coupled to the identified line card.

11. The method of claim 7, wherein the process information indicates a set of input parameters to a hash algorithm used by the link aggregation device in determining to which of the plurality of line cards the link aggregation device will forward data packets.

12. The method of claim 7, wherein the process information includes a hashing algorithm.

* * * * *